United States Patent [19]
Augenblick et al.

[11] 3,798,642
[45] Mar. 19, 1974

[54] RECOGNITION SYSTEM

[75] Inventors: Harry A. Augenblick, Mountain Lakes; William J. Engle, Ridgewood, both of N.J.

[73] Assignee: Microlab/Fxr, Livingston, N.J.

[22] Filed: Sept. 27, 1972

[21] Appl. No.: 292,751

Related U.S. Application Data

[63] Continuation-in-part of Ser. No. 85,127, Oct. 29, 1970, abandoned.

[52] U.S. Cl. ...... 343/7 ED, 340/258 R, 343/6.5 SS, 343/225
[51] Int. Cl. .............................................. G01s 9/56
[58] Field of Search ............ 340/280, 258 R, 258 C; 343/225, 6.5 R, 6.5 SS, 7 ED; 325/8

[56] References Cited
UNITED STATES PATENTS

| | | | |
|---|---|---|---|
| 3,631,484 | 12/1971 | Augenblick | 343/6.5 R |
| 3,108,275 | 10/1963 | Chisholm | 343/6.5 R |
| 3,299,424 | 1/1967 | Vinding | 340/258 C |
| 3,447,154 | 5/1969 | Schrader | 343/6.5 R |
| 3,128,416 | 4/1964 | Rode | 340/258 C |
| 3,384,892 | 5/1968 | Postman | 343/6.5 R |
| 3,182,314 | 5/1965 | Kleist et al. | 343/6.5 SS |
| 3,060,425 | 10/1962 | Cutler | 343/7 ED |

*Primary Examiner*—John W. Caldwell
*Assistant Examiner*—Marshall M. Curtis
*Attorney, Agent, or Firm*—Ryder, McAulay, Fields, Fisher & Goldstein

[57] ABSTRACT

A recognition system comprising a transmitter for radiating an amplitude modulated signal to a target that generates a harmonic of the received signal, detects the amplitude modulating signal and modulates the harmonic signal with the detected signal. The target contains a frequency selective network that produces a coded arrangement of signal components which comprise the signal returned by the target. A receiver detects the coded arrangement of signal components.

28 Claims, 18 Drawing Figures

INVENTORS
HARRY A. AUGENBLICK
WILLIAM J. ENGLE
BY
Irving Seidman
ATTORNEY.

INVENTORS
HARRY A. AUGENBLICK
WILLIAM J. ENGLE
BY
Irving Seidman
ATTORNEY.

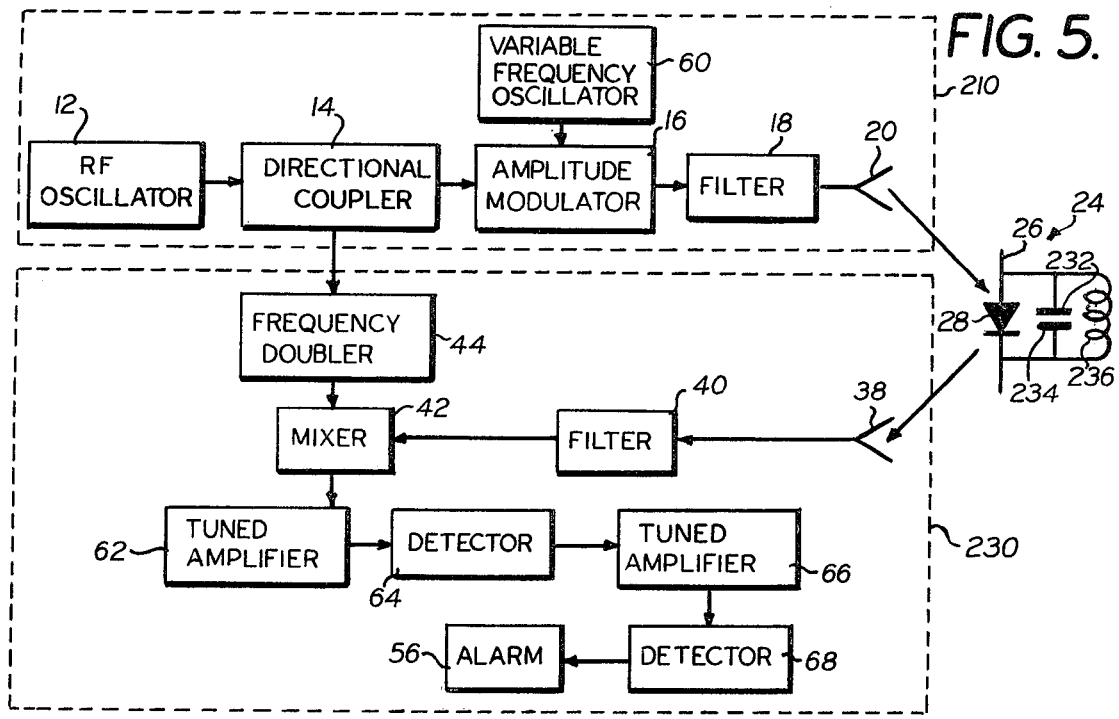
FIG. 5.
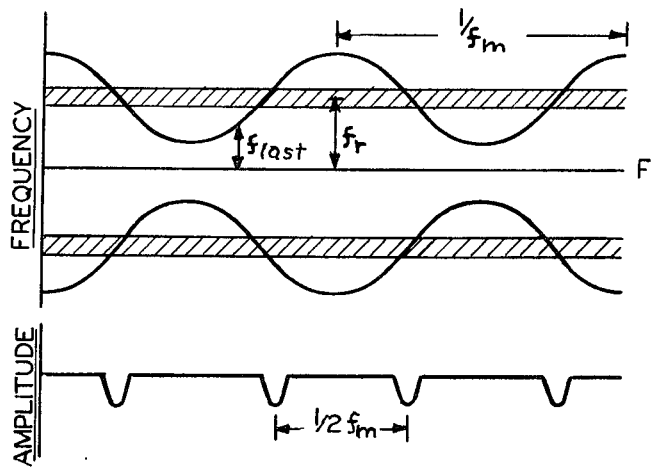
FIG. 6.
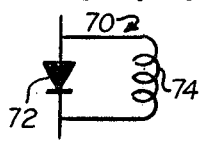
FIG. 7A.
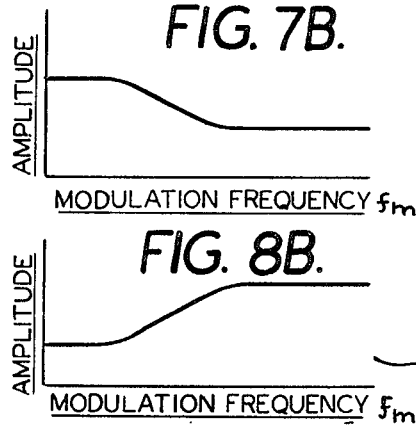
FIG. 7B.
FIG. 8B.
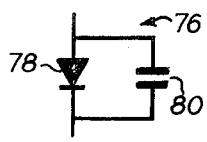
FIG. 8A.
INVENTORS
HARRY A. AUGENBLICK
WILLIAM J. ENGLE
BY
Irving Seidman
ATTORNEY.

3,798,642

RECOGNITION SYSTEM

This application is a continuation-in-part of our U.S. application Ser. No. 85,127, filed Oct. 29, 1970, now abandoned entitled "Detection System".

This invention relates generally to a recognition system for identifying one or more groups of harmonic generating targets and more particularly, pertains to personnel and object identification systems and the like.

Various techniques have been developed in the past for monitoring entrances to prevent unauthorized entry of persons or the unauthorized removal of merchandise. Some of these techniques utilize passive harmonic generating targets such as diodes that are embedded in or otherwise attached to an entry badge or a protected article. As the article or person wearing the badge enters a surveillance area, a transmitter sends a signal of fundamental frequency to the harmonic generator. The harmonic generating targets operate to radiate harmonics of the fundamental signal. The target and thus the article to which it is attached is thereupon detected by the reception of harmonic energy emanating from the area under surveillance. More specifically, harmonic receivers are usually provided to monitor such areas to and sound an alarm when such harmonic energy is detected.

One major difficulty encountered in connection with prior systems of the above-described types lie in the fact that numerous objects that are found in typical environments of the type under consideration are capable of generating harmonics of the fundamental signal when interrogated. For example, all electronic equipment containing diodes, transistors, or other semiconductors, such as transistor radios, tape recorders, phonographs, hearing aids, certain cameras and other photographic accessories, certain watches, and the like will reradiate such harmonic energy and thereby actuate an alarm, even though the passage of such objects is proper and authorized.

In addition to such manufactured diodes, transistors, and other semi-conductors, any metal-to-metal junction is capable of generating harmonics under certain conditions. Chain link fences, wire screening, loose coins, keys, paper clips, and countless other metal objects will convert a portion of a pure fundamental signal into harmonic energy, reradiate this harmonic energy, and cause an alarm signal to be emitted.

Accordingly, an object of the present invention is to provide an improved recognition system.

A more specific object of this invention is to provide a recognition system which will recognize and track a particular target to the exclusion of false tracking of similar targets.

Another object of the present invention is to provide a recognition system to identify a particular harmonic generating target or class of targets.

A further object of the present invention is to separately recognize two or more classes of harmonic generating targets.

A recognition system constructed according to the present invention comprises a transmitting unit which transmits an amplitude modulated signal. Target means receives the transmitted signal and generates a harmonic signal comprising a plurality of signal components having respective amplitudes. The target means further comprises amplitude varying means for varying the amplitude of at least one of the plurality of signal components to provide an output signal having a preselected coded arrangement of the amplitudes of the plurality of signal components. Receiving means receives the output signal and comprises sensing means which produces a recognition signal when the preselected coded arrangement of amplitudes of the plurality of signal components is received.

Other features and advantages of the present invention will become more apparent from a consideration of the following detailed description, when taken in conjunction with the accompanying drawings.

FIG. 5 illustrates a circuit diagram, in clock form, of a further modified embodiment of a system;

FIG. 6 illustrates, in graphical form, the frequencies associated with the system shown in FIG. 5;

Figure 10:
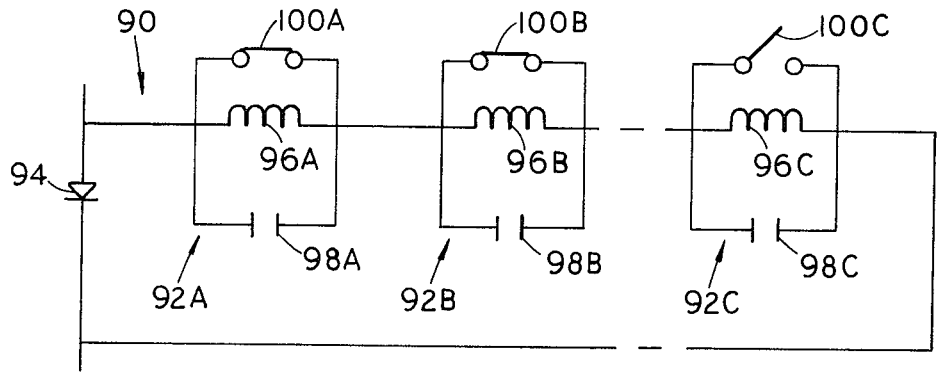
Figure 11:
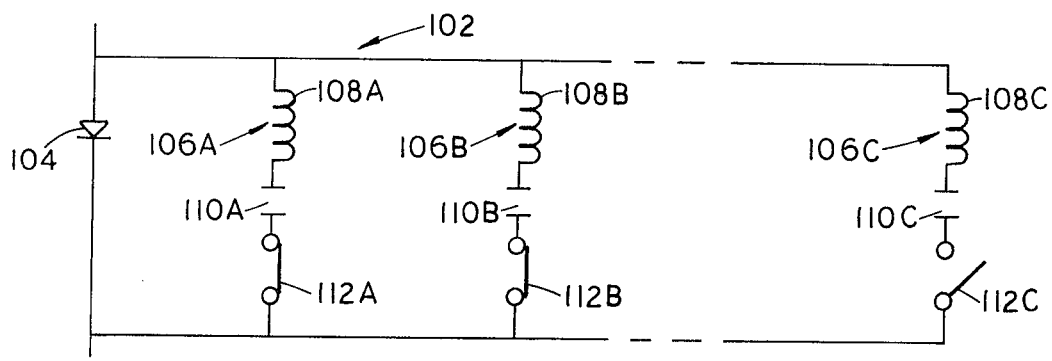
Figure 12:
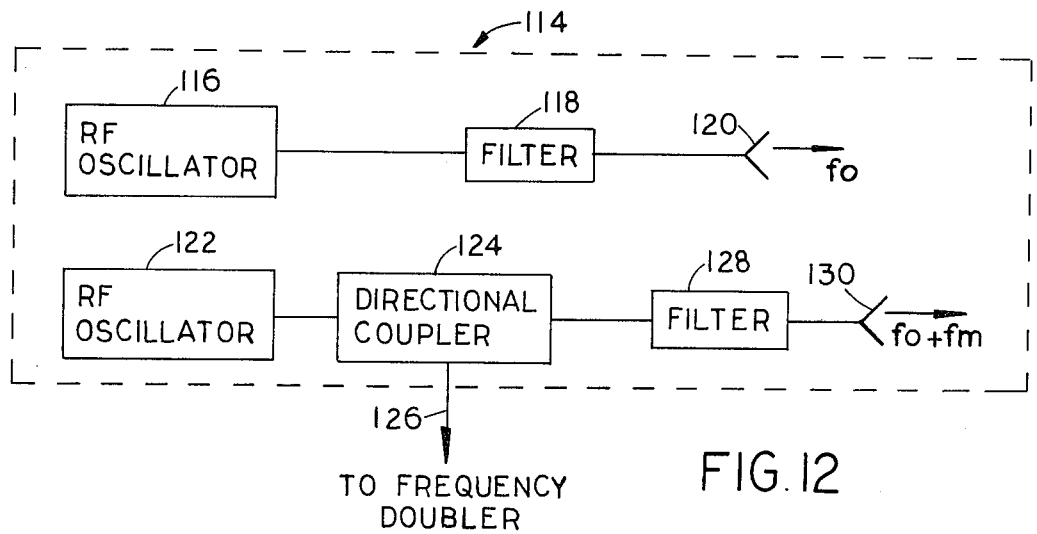

FIGS. 7A, 7B, 8A, 8B 9, 10 and 11 illustrate, in schematic and graphical form, respective embodiments of harmonic generating targets with different frequency selective networks, forming a portion of the system of the invention; and FIG. 12 is a block diagram of a modified embodiment of a transmitter forming a portion of the system of the invention.

As noted hereinabove, the present invention includes a harmonic generating target. While a number of elements can generate harmonics, the present invention will be described in conjunction with a semiconductor diode. However, this is not to be interpreted as being a limitation on the present invention since any device which generates harmonic signals from a received signal of fundamental frequency may be utilized. Moreover, as noted below, the present system includes detection of the amplitude modulating signal transmitted to the target. Hence, the diode should also provide efficient detection at the frequencies of interest.

Certain specific frequencies of operation will be specified hereinbelow. However, it is again emphasized that these ranges of frequencies are for illustrative purposes only and the/invention is not to be interpreted as being limited in operation in these particular ranges.

Additionally, the receiver described hereinbelow will be of the so-called homodyne type. However, it is again emphasized that the homodyne type receiver is for illustrative purposes only and the invention is not to be interpreted as being limited to such a receiver.

Figure 1:
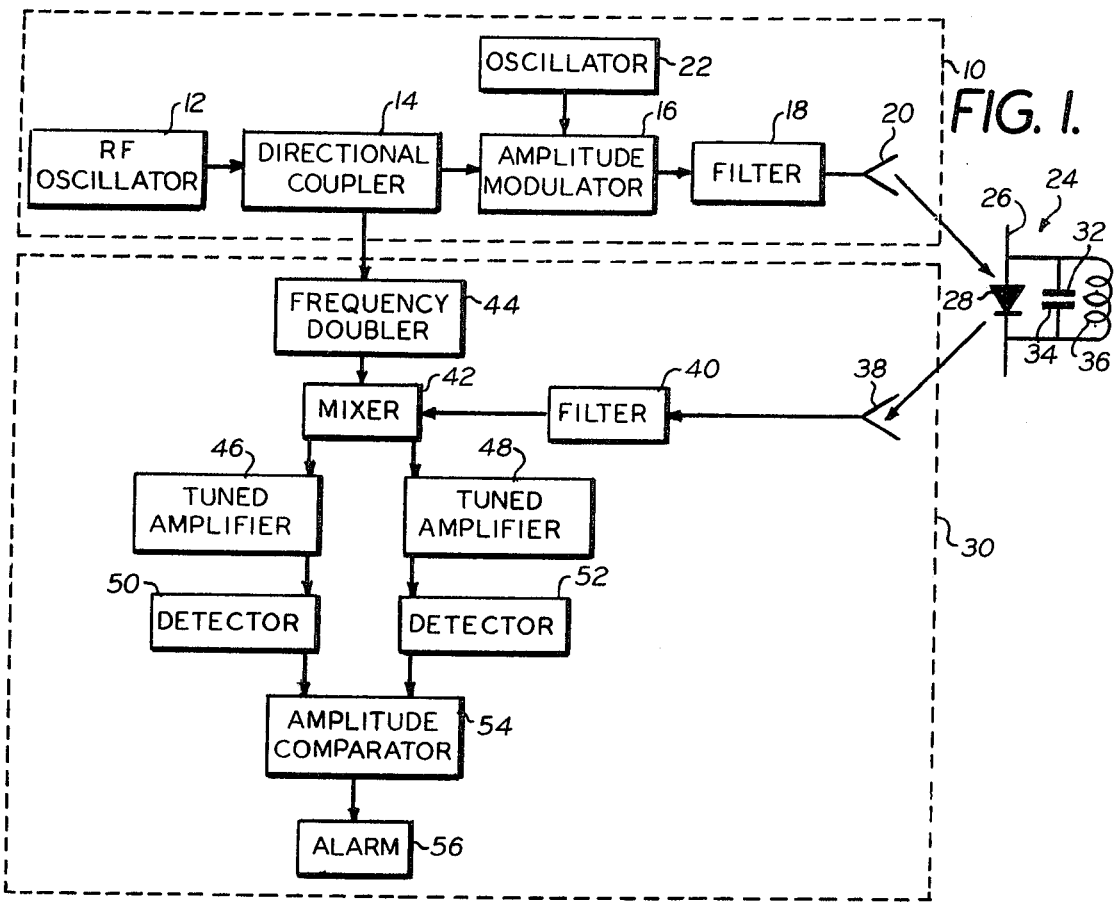
FIG. 1 is a block diagram of a system constructed according to the present invention.
Figure 2A:
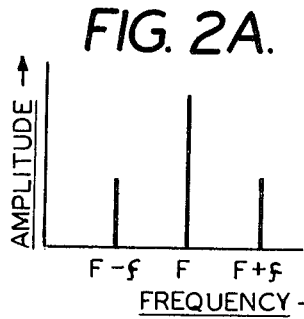
FIGS. 2A, 2B and 2C illustrate, in graphical form, the frequency spectrum associated with the system shown in FIG. 1.

Accordingly, FIG. 1 illustrates a system constructed in accordance with the present invention and includes a transmitting unit 10 having an oscillator 12 which generates a signal of fundamental frequency F. These signals are applied to a series chain comprising a directional coupler 14, an amplitude modulator 16, and a filter 18. The output signal is transmitted from an antenna 20 which is connected to the filter 18. An information oscillator 22 which generates a modulating signal of frequency f is connected to the amplitude modulator 16. Accordingly, antenna 20 radiates a signal of fundamental frequency F which is amplitude modulated by the modulating frequency $f$. It is well known that this radiation is represented by a carrier of frequency F and two sidebands of frequency $F + f$ and $F - f$, as shown in FIG. 2A.

A target designated generally by the reference character 24 is positioned in the path of signals radiated from antenna 20. This target comprises an antenna 26 which will receive energy from the radiated signals. A harmonic generating element or diode 28 is connected thereto which receives energy from the antenna 26 and reradiates a harmonic thereof back to a receiving unit designated generally by the reference numeral 30. A reactive or frequency selective network 32 comprising a capacitor 34 and an inductor 36 is connected across the diode 28.

Figure 2B:
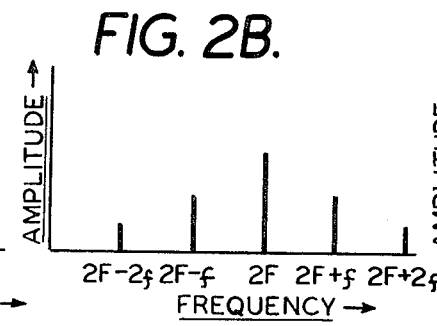

The output signal produced by the diode 28 will be a distorted waveform of the input signal of frequencies F, $F +f$, and $F -f$ because of the inherent nonlinear characteristics of the diode. Accordingly, the output signal will contain a number of harmonics of frequency F, such as, for example, a signal of frequency 2F. Because of the inherent nonlinear characteristics of the diode, as noted in greater detail below, each such harmonic of frequency F will be surrounded by sidebands separated from each other and from such harmonic of frequency F by the modulating frequency $f$. For example, the harmonic signal of frequency 2F will be surrounded by sideband signals of frequency $2F \pm f$, $2F \pm 2f$, $2F \pm 3f$ and so on. The amplitudes of these sideband signals decreases with increasing frequency separation from the harmonic frequency signal and are less than the amplitude of the signals of harmonic frequency that they surround. For example, the amplitudes of signals of frequencies $2F \pm f$ are less than the amplitude of the signal of frequency 2F, and the amplitudes of signals of frequencies $2F \pm 2f$ are less than the amplitudes of signals of frequencies $2F \pm f$, as shown in FIG. 2B.

Figure 2C:
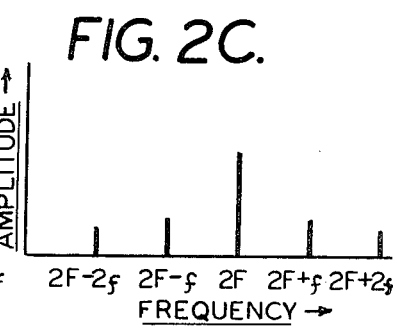

In the absence of frequency selective network 32, the ratio of the amplitudes of the signals of frequencies $2F\pm f$, to the amplitudes of frequencies $2F \pm 2f$, is substantially constant. This ratio is altered if the impedance of network 32 is different at frequency $f$ than it is at frequency $2f$. Such impedance difference is most pronounced when the reactive network 32 is resonant at frequency $f$ and is not resonant at frequency $2f$, as shown in FIG. 2C. Thus, the amplitudes of signals of frequencies $2F\pm f$ are significantly altered by the reactive network 32 whereas the amplitudes of signals of frequencies 2F and $2F \pm 2f$ are relatively unaffected by the resonant circuit. Accordingly, the ratio of amplitudes of signals of frequenceis $2F \pm f$ to the amplitudes of signals of frequencies $2F \pm 2f$ is one value for targets which include a frequency selective network 32 and is another value for all other targets which do not include network 32. To put this another way, the target and the frequency selective network essentially produce an output signal comprising a coded arrangement of signal components wherein the network controls the desired coding of the signal components.

At present, it is believed that the reason the coding of the signal components is obtained is due to the fact that the diode, in addition to producing harmonics of the received signal, also detects the amplitude modulating signal. This detected signal produces a potential across the network. The network causes an alteration of the amplitude of this potential in accordance with the impedance of network This potential across the network is then applied to the diode and amplitude modulates the harmonic signals thereby providing the coded spectrum of signals.

In light of the above, it will be obvious that the diode can be replaced by discrete devices which perform the same function such as a separate and distinct harmonic generator, detector and amplitude modulator. Additionally, the frequency selective network need not be limited to reactive components but may comprise a resitor-capacitor circuit or a resistor-inductor circuit.

A receiving unit 30 is provided which includes a receiving antenna 38 which is connected to a series chain comprising a filter 40 and a mixer 42. In view of the fact that the second harmonic of the fundamental F is used in the illustrative embodiment of the present invention, a frequency doubler 44 is connected between the directional coupler 14 ane the mixer 42. However, if a harmonic other than the second harmonic is utilized, an appropriate frequency multiplier will be used instead of the frequency doubler 44.

The filter 18 is tuned to the fundamental frequency F and the filter 40 is tuned to the second harmonic frequency 2F. Both filters have relatively wide pass bands so that signals in the vicinity of the respective frequencies F and 2F will not be attenuated. Accordingly, the mixer 42 receives a signal of frequency 2F from the frequency doubler 44 and signals of frequencies 2F, $2F \pm f$, and $2F \pm 2f$ from the filter 40 and produces, among other signals, a signal having a frequency equal to the difference between the frequencies of the two signals in the conventional manner. This difference signal contains frequencies $f$ and $2f$, the relative amplitudes of which having been previously altered by the network 32 in the target. Signals of frequencies $f$ and $2f$ are respectively amplified in tuned amplifiers 46 and 48 and are detected by detectors 50 and 52, respectively, connected thereto. The ratio of the output signals of detectors 50 and 52 is determined in an amplitude comparator 54, which ratio is equal to the ratio of the amplitudes of signals of frequencies $2F \pm f$ to the amplitudes of signals of frequencies $2F \pm 2f$ as radiated by the target. When this ratio is that of a target with a resonant frequency selective network 32, such as shown in FIG. 2C, an alarm 56 is activated by a recognition signal at the output of the comparator 54. When this ratio is that of a target with a different or no network, such as shown in FIG. 2B, or when no target is present, the alarm is not activated.

Accordingly, a recognition system has been disclosed which reliably detects the presence of a particular harmonic generating target although other harmonic generating targets may be in the area under surveillance.

Figure 3:
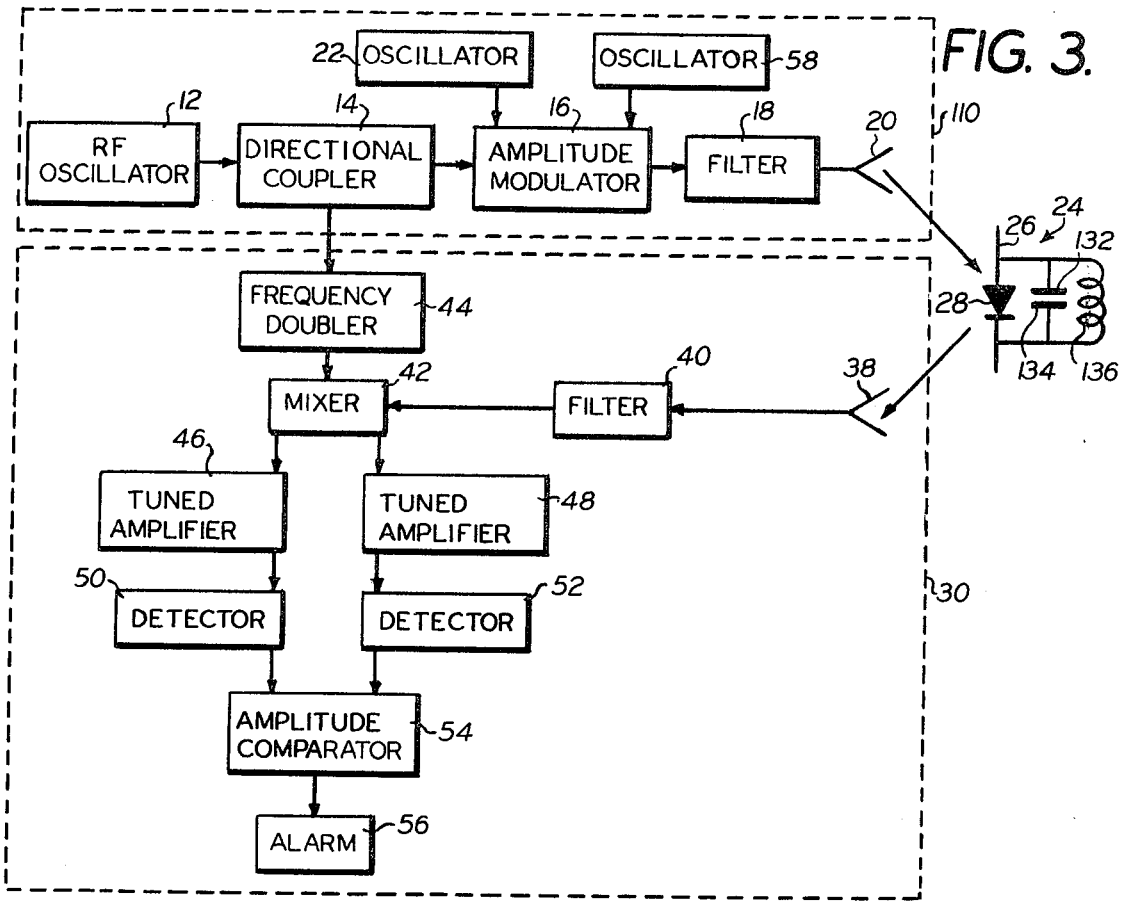
FIG. 3 illustrates a circuit wiring diagram, in block form, of a modified embodiment of a system constructed according to the invention.

An alternate embodiment of a system for recognizing a target which includes a network is described hereinbelow. Similar reference characters in the figures represent identical elements. The system is shown in FIG. 3 and includes a transmitting unit 110 which is substantially similar to the transmitting unit 10 of FIG. 1 with the exception that a second local oscillator 58 is provided.

Figure 4A:
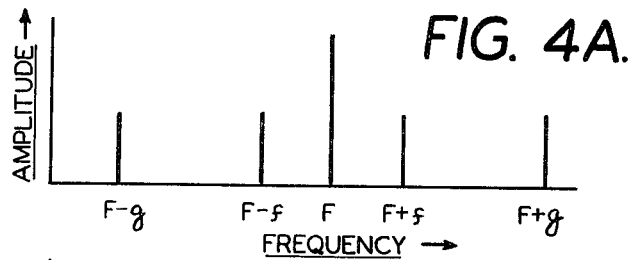
FIGS. 4A, 4B and 4C illustrate, in graphical form, the frequencies associated with the system shown in FIG. 3.
Figure 4B:
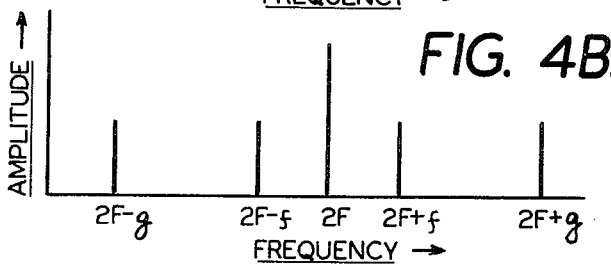
Figure 4C:
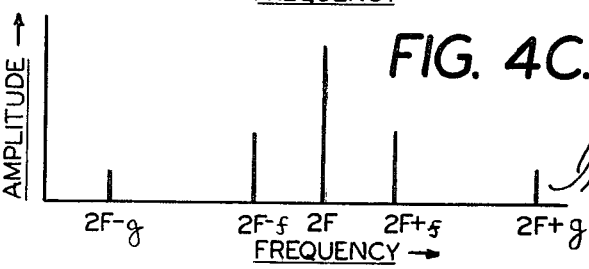

More specifically, oscillators 22 and 58 are connected to amplitude modulator 16 and generate equal amplitude modulating signals of frequencies $f$ and $g$. Accordingly, antenna 20 radiates a signal of fundamental frequency F amplitude modulated by modulating signals of frequencies $f$ and $g$, as shown in FIG. 4A. The target 24 reradiates signals of frequencies $2F$, $2F \pm f$, $2F \pm g$, $2F \pm 2f$, $2F \pm 2g$, and so on. Because the higher order mixing components have a lower amplitude, frequencies $2F \pm 2f$, $2F \pm 2g$, and so on are not considered. Accordingly, the signal reradiated by the target 24 with no frequency selective network will contain equal amplitude signals of frequencies $2F \pm f$ and $2F \pm g$, as shown in FIG. 4B. When the network 132 is resonant at frequency $g$, the amplitude of signal frequencies $2F \pm g$ will be altered, all shown in FIG. 4C and the ratio of the amplitude of signals of frequencies $2F \pm f$ to the amplitudes of signals of frequencies $2F \pm g$ will no longer be unity.

The tuned amplifiers 46 and 48 are tuned to frequencies $f$ and $g$ respectively. These signals are detected in detectors 50 and 52 and the ratio of the output signals of detectors 50 and 52 is determined in the amplitude comparator, which ratio is equal to the ratio of the amplitudes of signals of frequencies $2F \pm f$ to the amplitudes of signals of frequencies $2F \pm g$ as radiated by the target 24. This ratio is unity unless network 132 is attached to the target. Accordingly, the alarm 56 is activated when this ratio is not equal to unity.

Two or more different classes of targets may be separately recognized by the application of three or more modulating frequencies to the amplitude modulator 16.

A further modified embodiment of a detection system constructed according to the present invention includes a variable frequency oscillator 60 (FIG. 5) which is connected to the amplitude modulator 16 in the transmitter unit 210. Thus, the output signal radiated from the antenna 20 will be the carrier signal of frequency F modulated by a signal $f_m$ which varies with time between $f_{min}$ and $f_{max}$. Although the modulating waveform is assumed to be a sinusoidal function for illustrative purposes, it is to be noted that the invention is not limited thereto as the modulating waveform may be a triangular wave, etc. However, in accordance with the invention, at one point the frequency of the modulating waveform must be equal to the resonant frequency $f_r$ of the network 232 of the target 24. Hence, when the instantaneous frequency $f_{inst}$ of the modulating waveform or signal $f_m$ is equal to $f_r$, the amplitude A of the signals of frequencies $2F \pm f_m$ that is radiated by the target 24 will be altered, thereby creating a unique response.

To be more specific, as shown in FIG. 6, the carrier signal of frequency F has an envelope the period of which is $1/f_m$. During a cycle of the modulating signal the modulating waveform will sweep through the resonant frequency $f_r$ of the tuned circuit 232 twice. As a result, there will be two amplitude discontinuities per cycle of the modulating signal. Accordingly, the period of amplitude modulation, as shown in FIG. 6, is $1/2f_m$.

A tuned amplifier 62 in the receiver 230 amplifies all of the frequency components of modulation frequency $f_m$ received from the target 24. A detector 64 is connected to the output terminals of the tuned amplifier 62 and provides at its output terminals a signal that varies in amplitude in proportion to the amplitude A of the signal of frequency $2F \pm f_m$ that is radiated by the target 24. As noted above, this output signal of the detector 64 will have a frequency which is twice the repetition rate of the modulating signal (i.e., the period of the amplitude signal is $1/2f_m$). A tuned amplifier 66 is connected to the detector 64 and amplifies the signals having a frequency of $2f_m$. A detector 68, which is connected to the amplifier 66 detects signals of frequency $2f_m$ and actuates the alarm 56 if any such signals are detected.

FIGS. 7–11 illustrate respective modified embodiments of targets for use with the systems described and FIGS. 7–9 also show the amplitude characteristics of the waveform radiated from the respective target as a function of the modulation frequency $f_m$.

To be more specific, FIG. 7A illustrates a target 70 which includes a diode 72 and an inductor 74 connected thereacross. The amplitude of the signal $2F \pm f_m$ radiated from the target 70 as a function of the modulating signal $f_m$ is as shown in FIG. 7B.

FIG. 8A illustrates a target 76 comprising a diode 78 and a capacitor 80 connected thereacross. The amplitude of the signal $2F \pm f_m$ radiated from the target 76 is shown in FIG. 8B as a function of the signal $f_m$.

Figure 9A:
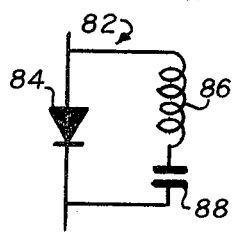
Figure 9B:
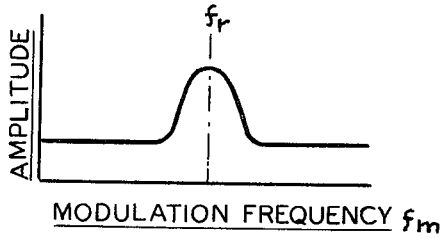

FIG. 9A illustrates a target 82 comprising a diode 84 and the series circuit of an inductor 86 and a capacitor 88 connected thereacross. The amplitude of the signal $2F \pm f_m$ radiated from the target 82 is illustrated in FIG. 9B as a function of the modulating signal $f_m$. The amplitude reaches a peak at the frequency $f_r$, which is the resonant frequency of the series tuned circuit comprising the capacitor 88 and the inductor 86.

FIG. 10 illustrates a further embodiment of a target 90 having multiple frequency selective networks 92A, 92B and 92C connected across a diode 94. The network comprises inductors 96A–96C and capacitors 98A–98C respectively connected in parallel therewith. Connected across each such network is a respective shorting switch 100A–100C. When a switch is closed, the network associated with it is essentially disabled. Moreover, each network may be tuned to a different frequency so that the response of any one single target will be unique and will be dependent upon the fact as to which shorting switches are closed.

That is, with all shorting switches open, the networks will provide a plurality of stop bands. Closing selected ones of the shorting switches 100A–100C will alter the pattern of stop bands. The closed shorting switches may be chosen so that the signal returned by the target is a desired preselected coded arrangement thereby increasing the recognition capabilities of the system. It is obvious that more than three networks may be added to further increase the capability of the system. Moreover, the shorting switches may simply be wires which are cut either by the manufacturer or by the purchaser to enhance security.

FIG. 11 illustrates a target 102 which is similar to the target 90 of FIG. 10 and includes multiple frequency selective circuits which are series resonant rather than parallel resonant as shown in FIG. 10. Thus, the target 102 includes diode 104 and frequency selective networks 106A–106C connected thereacross. The networks respectively comprise the series circuits of inductors 108A–108C, capacitors 110A–110C and switches 112A–112C. When a switch is opened the reactive elements associated therewith will be disabled.

FIG. 12 illustrates a modified embodiment of a transmitter 114 constructed according to the present invention. The transmitter 114 includes a first RF oscillator 116 which produces a signal $F_o$. Connected in series with the oscillator 116 is a filter 118, which passes the frequency $F_o$, and an antenna 120 which radiates the signal $F_o$ to the target.

Additionally, the transmitter includes a second RF oscillator 122 which produces a signal $F_o + f_m$. The oscillator 122 is connected to a directional coupler 124 which connects the signal with the frequency doubler in the receiver 30 via the lead 126. Also connected to the coupler 124 is a filter 128 which passes the signal $F_o + f_m$ to an antenna 130.

As is conventional in a two frequency system of the type described, the signal received by the target will be an amplitude modulated signal wherein the modulations will vary at the frequency $f_m$. Thus, the transmitter 114 may be used in place of a transmitter having an amplitude modulator therein.

While preferred embodiments of the invention have been shown and described herein, numerous omissions, changes and additions may be made in such embodiments without departing from the spirit and scope of the present invention.

What is claimed is:

1. An electronic recognition system comprising transmitting means for transmitting an amplitude modulated signal; target means adapted to receive said modulated signal for generating a harmonic signal having a plurality of signal components, having respective amplitudes, said target means further comprising amplitude varying means for varying the amplitude of at least one of said plurality of signal components to obtain an output signal having a preselected coded arrangement of the amplitudes of said plurality of signal components; and receiving means responsive to said output signal, said receiving means comprising sensing means for producing a recognition signal when said preselected coded arrangement of amplitudes of said plurality of signal components is received.

2. An electronic recognition system as in claim 1, in which said transmitting means comprises signal-producing means for producing a signal of preselected frequency, and modulator means for amplitude modulating said signal of preselected frequency.

3. An electronic recognition system as in cliam 1, in which said transmitting means includes signal-producing means for generating at least two signals for different preselected frequencies.

4. An electronic recognition system as in claim 1, in which said target means comprises a harmonic generator for generating at least a harmonic signal from said modulated signal, detecting means for detecting the amplitude modulating signal, means for applying the detected signal to said amplitude varying means, and modulating means for modulating said harmonic signal with the signal from said amplitude varying means.

5. An electronic recognition system as in claim 1, in which said target means further comprises a diode connected across said amplitude varying means.

6. An electronic recognition system as in claim 1, in which said amplitude varying means comprises a frequency selective network for altering at least one of said plurality of signal components.

7. An electronic recognition system as in claim 1, in which said amplitude varying means comprises a plurality of frequency selective networks for altering different ones of said plurality of signal components.

8. An electronic recognition system as in claim 7, and disabling means for selectively disabling predetermined ones of said plurality of frequency selective networks.

9. An electronic recognition system as in claim 1, in which said amplitude varying means comprises a tuned circuit which is tuned to the frequency of one of said signal components.

10. An electronic recognition system as in claim 1, in which said transmitting means comprises at least one signal generator for generating a signal of pre-selected frequency, and said receiving means includes multiplying means connected to said transmitting means for multiplying said signal of preselected frequency to produce a component signal of said harmonic signal, mixing means for mixing said received harmonic signal with said multiplied signal, said sensing means comprising comparing means for comparing the amplitudes of said received signals and for producing said recognition signal when the amplitudes of said signal components are in said preselected arrangement.

11. An electronic recognition system as in claim 10, and an alarm device responsive to said recognition signal for producing an indication that said recognition signal has been generated.

12. An electronic recognition system as in claim 2, in which said modulating means comprises at least two signal generators for modulating said signal of preselected frequency with modulating signals of different frequencies.

13. An electronic recognition system as in claim 2, in which said modulator means comprises a variable frequency signal generator for modulating said signal of preselected frequency with a signal the frequency of which varies with time.

14. An electronic recognition system as in claim 13, in which said sensing means further comprises amplitude responsive means for generating a signal proportional to the amplitude of said received signal.

15. An electronic recognition system as in claim 14, and alarm means connected to said amplitude responsive means for producing said recognition signal when the amplitude of the signal from said amplitude responsive means reaches a preselected value.

16. A recognition system comprising transmitting means for transmitting an amplitude modulated signal comprising a plurality of signal components, a target comprising harmonic generator means operable to receive said amplitude modulated signal for generating a harmonic output signal, detecting means for producing a detected signal comprising at least some of the components of the amplitude modulated signal, modulating means for modulating said harmonic output signal with said detected signal, and a frequency selective network for altering the amplitude of at least one of the components comprising said detected signal to produce a coded arrangement of signal components which comprise said harmonic output signal; and receiving means for producing a recognition signal when said coded arrangement of signal components is sensed.

17. A recognition system as in claim 16, in which said transmitting means comprises oscillator means for generating at least two signals of different preselected fundamental frequencies, and an antenna for radiating said two signals to produce a composite amplitude modulated signal which is modulated by a signal having a frequency equal to the difference in frequency between said two signals.

18. A recognition system as in claim 16, in which said harmonic generator means, detecting means and modulating means comprise a diode connected across said frequency selective network.

19. A recognition system as in claim 16, in which said frequency selective network is a parallel resonant circuit.

20. A recognition system as in claim 16, in which said frequency selective network is a series resonant circuit.

21. A recognition system as in claim 16, in which said frequency selective network comprises a resistor connected to a reactive element.

22. A recognition system as in claim 16, in which said frequency selective network comprises a filter having a plurality of stop bands.

23. A recognition system as in claim 22, and switch means connected to said filter for selectively varying the stop bands of said filter.

24. A target for use with a recognition system adapted to produce an amplitude modulated signal at said target, said target comprising harmonic means for generating a harmonic of said amplitude modulated signal, detecting means for detecting the amplitude modulated signal, amplitude varying means for varying the amplitude of preselected components in said detected signal, and modulating means for modulating the harmonic signal with the signal from said amplitude varying means to produce an otuput signal having a predetermined coded arrangement of signal components.

25. A target as in claim 24, in which said amplitude varying a frequency comprises afrequency selective network.

26. A target as in claim 25, in which said amplitude varying means comprises a plurality of frequency selective networks.

27. A target as in claim 26, and selectively operable disabling means for disabling desired ones of said plurality of frequency selective networks.

28. A target as in claim 24, in which said harmonic means, detecting means and modulating means comprise a diode.

* * * * *